United States Patent [19]
Amos et al.

[11] Patent Number: 6,096,811
[45] Date of Patent: *Aug. 1, 2000

[54] MODIFYING AGENTS FOR POLYOLEFINS

[75] Inventors: Stephen E. Amos, Minneapolis; George G. I. Moore, Afton; Kent E. Nielsen; Markus A. Wicki, both of St. Paul, all of Minn.

[73] Assignee: 3M Innovative Properties Company, St. Paul, Minn.

[*] Notice: This patent is subject to a terminal disclaimer.

[21] Appl. No.: 09/054,622

[22] Filed: Apr. 3, 1998

Related U.S. Application Data

[63] Continuation-in-part of application No. 08/773,704, Dec. 27, 1996, Pat. No. 5,929,146.

[51] Int. Cl.[7] .............................. C08K 5/15; C08K 5/34
[52] U.S. Cl. ........................... 524/89; 524/109; 524/112; 524/291
[58] Field of Search ............................ 524/89, 109, 112; 525/375, 386; 528/486, 492

[56] References Cited

U.S. PATENT DOCUMENTS

| | | | |
|---|---|---|---|
| 3,201,363 | 8/1965 | Spurlin | 260/30.4 |
| 3,207,736 | 9/1965 | Wijga | 260/93.7 |
| 3,234,233 | 2/1966 | Bolger | 260/326 |
| 3,320,267 | 5/1967 | Poos | 260/295 |
| 3,367,926 | 2/1968 | Voeks | 260/93.5 |
| 3,527,736 | 9/1970 | Averink et al. | 260/78.4 |
| 3,873,643 | 3/1975 | Wu et al. | 260/878 R |
| 3,882,194 | 5/1975 | Krebaum et al. | 260/878 R |
| 3,928,687 | 12/1975 | Wada et al. | 528/486 |
| 3,941,746 | 3/1976 | Stephen | 260/45.8 |
| 4,039,491 | 8/1977 | Ikeda et al. | 260/4 R |
| 4,134,895 | 1/1979 | Roth et al. | 260/326.41 |
| 4,452,942 | 6/1984 | Shida et al. | 525/74 |
| 4,476,184 | 10/1984 | Lubowitz et al. | 428/288 |
| 4,503,219 | 3/1985 | Reffert et al. | 528/486 |
| 4,704,421 | 11/1987 | Teskin | 528/486 |
| 4,739,017 | 4/1988 | Tabor et al. | 525/300 |
| 4,778,837 | 10/1988 | Waterman et al. | 524/89 |
| 4,801,637 | 1/1989 | McCullough | 528/486 |
| 4,829,114 | 5/1989 | Trotoir et al. | 524/243 |
| 5,013,778 | 5/1991 | Bath | 524/173 |
| 5,135,975 | 8/1992 | Rekers | 524/108 |
| 5,342,868 | 8/1994 | Kimura et al. | 524/108 |

FOREIGN PATENT DOCUMENTS

| | | | |
|---|---|---|---|
| 0 267 695 | 5/1988 | European Pat. Off. | C08K 5/00 |
| 2 075 549 | 9/1971 | France | C08F 45/00 |
| 2 656 620 | 7/1991 | France | C08L 23/02 |
| 1 544 851 | 5/1970 | Germany | C08F 29/02 |
| 1 694 914 | 3/1972 | Germany | C08F 29/02 |
| 53-40760 | 4/1978 | Japan | C07D 209/48 |
| 57-18682 | 1/1982 | Japan | C07D 493/04 |
| 58-160343 | 9/1983 | Japan | C08L 67/02 |
| 60-13837 | 1/1985 | Japan | C08L 51/04 |
| 61-17834 | 5/1986 | Japan | C07D 493/04 |
| 1-180514 | 7/1989 | Japan | G02C 7/02 |
| 7-173342 | 7/1995 | Japan | C08L 23/10 |
| 2 290 296 | 12/1995 | United Kingdom | C08K 5/3412 |

OTHER PUBLICATIONS

Fillon et al., "Self–Nucleation and Recrystallization of Isotactic Polypropylene (α Phase) Investigated by Differential Scanning Calorimetry," Journal of Polymer Science: Part B: Polymer Physics, vol. 31, pp. 1383–1393 (1993).

Fillon et al., "Self–Nucleation and Enhanced Nucleation of Polymers. Definition of a Convenient Calorimetric 'Efficiency Scale' and Evaluation of Nucleating Additives in Isotactic Polypropylene (α Phase)," Journal of Polymer Science: Part B: Polymer Physics, vol. 31, pp. 1395–1405 (1993).

Beck et al., "Heterogeneous Nucleating Agents for Polypropylene Crystallization," Journal of Applied Polymer Science, vol. 11, pp. 673–685 (1967).

Snider et al., "Mn(III)–Based Oxidative Free Radical Cyclization of Unsaturated Ketones," J. Org. Chem. 60, pp. 5376–5377 (1995).

Overman, et al., "An Annual Publication of Satisfactory Methods for the Preparation of Organic Chemicals," Organic Syntheses, vol. 71, pp. 48–55 (1993).

*Primary Examiner*—Veronica P. Hoke
*Attorney, Agent, or Firm*—Daniel C. Schulte; Charles L. Dennis, II

[57] ABSTRACT

Modifying agents for polyolefins improve the physical and/or optical properties of the polymers and have formula (I):

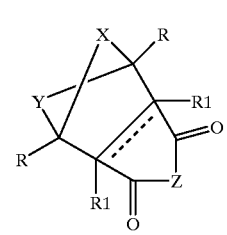

(I)

and salts thereof, wherein X, Y, Z, R and R1 are as defined in the specification.

34 Claims, No Drawings

MODIFYING AGENTS FOR POLYOLEFINS

This is a continuation in part of application Ser. No. 08/773,704 filed Dec. 27, 1996, now U.S. Pat. No. 5,929,146.

FIELD OF THE INVENTION

The invention is directed to heterocyclic modifying agents that can improve properties of compositions made from polyolefins such as polypropylene. These modifying agents improve the optical and/or physical properties of polymers and polymer blends to which they are added. The invention further relates to compositions that contain a polyolefin and a modifying agent as described herein, and to methods of improving the optical and physical properties of polyolefins using the modifying agents of the invention.

BACKGROUND OF THE INVENTION

Polyolefins, including polypropylene, are used in a variety of industrial applications. For some of these applications, such as packaging, storage containers, disposable medical devices, and so on, it is necessary or desirable that the product or article be optically clear. The optical and physical properties of the polyolefins are largely dependent upon the number of nucleation sites and the rate of nucleation during the crystallization process. The nucleation step of the overall crystallization process for polyolefins such as stabilized polypropylene is generally slow, so that a relatively small number of nucleation sites are formed. These nucleation sites are the points at which spherulites start to grow during the subsequent crystallization step. Because the number of sites is low, the spherulites can grow to a large size. When the size of the spherulites is larger than the wavelength of incident light, the light scatters and the polyolefin has a hazy appearance.

The size of the spherulites can be reduced and the optical properties of the polyolefin improved by the addition of nucleating and/or clarifying agents ("modifying agents") during processing. These agents increase the number of nucleation sites, and therefore the rate of nucleation. The size of the spherulites that form at these sites is smaller and the spherulites are more numerous as a result of this heterogeneous nucleation. If the spherulites are smaller in size than the wavelength of incident light, scattering of the light is substantially reduced and the resin appears clear.

Reduction of spherulite size also affects the physical properties of the polyolefin, e.g. flexural modulus, heat distortion temperature, impact strength and elongation at break of the resin can change with the addition of a modifying agent. The enhanced heterogeneous nucleation raises the crystallization onset temperature of the resin. This can result in a reduced cycle time during processing and greater manufacturing efficiency.

Nucleating and clarifying agents are generally known in the polymer art. U.S. Pat. No. 5,135,975 describes clarifing agents commercially known as the Millad™ group of products produced by Milliken Chemicals. These additives, particularly Millad™ 3988 have good organoleptic properties and resist plate-out, but dispersion problems resulting in the appearance of white specks have been encountered by some users. Relatively high process temperatures are needed to prevent the appearance of these white specks. Related clarifiers are described in JP 57-018682 and in JP 86-017834.

U.S. Pat. No. 5,342,868 describes the use of various organophosphorus salts as clarifiers for various crystalline synthetic resins. These additives perform well but their higher cost makes them somewhat less economical for use on a large scale.

There is a need in the art for agents that can be added to polyolefins such as polypropylene that are compatible with the polyolefins and stable under polyolefin processing conditions, that improve the optical and/or physical properties of the polyolefin, and that may be efficiently obtained or produced.

SUMMARY OF THE INVENTION

We have found that compounds of formula (I) and salts thereof are useful modifying agents for polyolefins, especially as nucleating and/or clarifying agents:

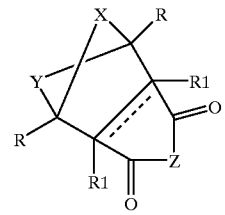

(I)

each R3 is independently selected from —OH, —O—$C_{1-18}$ alkyl, —O-aryl, —O-substituted aryl, or —NR4R5;

R4 and R5 are independently —H, $C_{1-18}$ alkyl, $C_{3-18}$ cycloalkyl, aryl, or substituted aryl; or a salt thereof.

Accordingly, the invention provides compositions comprising a polyolefin and an effective nucleating or clarifying amount of a compound of formula (I), or a salt thereof.

The invention further provides a method of enhancing the crystallinity of a polyolefin by adding an effective amount of a compound of formula (I), or a salt thereof, to the polyolefin.

The compounds of formula (I) act as modifying agents, e.g. nucleating and/or clarifying agents, for polyolefins. A nucleating agent acts to improve the physical properties of the polyolefin such as strength, weatherability, solvent resistance, heat deflection temperature and so on by providing sites for crystal formation, resulting in formation of increased numbers of spherulites. If the spherulites are sufficiently large to scatter visible light, the polyolefin material will not be optically clear. A clarifying agent provides compositions that are more optically clear by causing the formation of spherulites that are sufficiently small that they scatter less visible light. Generally, the different physical properties of the polyolefin such as the yield stress and impact resistance tend to vary as the spherulites become smaller in size, so that the desired optical clarity and physical properties should be balanced when determining the type and amount of modifying agent to use.

DETAILED DESCRIPTION OF THE INVENTION

The modifying agents are compounds of formula (I):

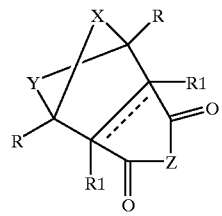

(I)

wherein X is selected from
  $C_{1-18}$ alkylene, $C_{2-18}$ alkenylene, $C_{3-18}$ cycloalkylene, $C_{4-18}$ cycloalkenylene, arylene, and —O—;
Y is selected from
  $C_{1-18}$ alkylene, $C_{2-18}$ alkenylene, $C_{3-18}$ cycloalkylene, $C_{4-18}$ cycloalkenylene, arylene;
Z is selected from
  —O— and —NR2—;
each R is independently selected from
  —H, $C_{1-18}$ alkyl, $C_{3-18}$ cycloalkyl, $C_{2-18}$ alkenyl, $C_{4-18}$ cycloalkenyl, —COR3, —OH, $C_{1-18}$ alkoxy, and $C_{1-18}$ alkyl substituted by one or more —OH, halogen, —COR3, —S—$C_{1-18}$ alkyl, aryl, or substituted aryl groups;
each $R_1$, if present, is independently selected from
  —H, $C_{1-18}$ alkyl, $C_{3-18}$ cycloalkyl, halogen, and —OH;
each R2 is independently selected from
  $C_{1-18}$ alkyl substituted by one or more —COR3, and optionally one or more aryl or substituted aryl, $C_{1-18}$ alkyl substituted by one or more —OH, halogen, or —$C_{1-18}$ alkylene—S—$C_{1-18}$ alkyl, —OH, an other-than-linear-alkyl-substituted aryl, and —O—$C_{1-18}$ alkyl, optionally substituted by NR4R5;
each R3 is independently selected from —OH, —O—$C_{1-8}$ alkyl, —O-aryl, —O-substituted aryl, or —NR4R5;
R4 and R5 are independently —H, $C_{1-18}$ alkyl, $C_{3-18}$ cycloalkyl, aryl, or substituted aryl; or a salt thereof.

In the above formulas each alkyl, alkenyl, alkylene and alkenylene group can be straight or branched. For example, "$C_{1-18}$ alkyl" includes methyl, ethyl, n-propyl, i-propyl, n-butyl, s-butyl, i-butyl, t-butyl, and so on. The cycloalkyl, cycloalkenyl, aryl, cycloalkylene, cycloalkenylene, and arylene groups include groups that are alkyl substituted, up to the specified number of carbon atoms.

"Aryl" includes carbocyclic and heterocyclic aryl, but is preferably carbocyclic aryl, most preferably phenyl.

"Heterocyclic aryl" includes, for example, pyrrolyl, imidazolyl, indolyl, pyridyl, thiophenyl, furyl, and the like.

"Substituted aryl" includes any carbocyclic or heterocyclic aryl group substituted as desired, for example by one or more hydroxy, alkyl, cycloalkyl, alkoxy, or halogen.

An "other-than-linear-alkyl-substituted" aryl includes carbocyclic and heterocyclic aryl groups substituted by one or more substituted group that is not a linear alkyl group. The substituted group that is not a linear alkyl group can be, for example, hydroxy, cycloalkyl, alkoxy, acids such as carboxylic acid, and halogen groups. This can include such aryls that are additionally substituted by one or more alkyl group.

Each ring in the compound has a maximum of 8 ring atoms.

Many compounds useful in the invention contain one or more chiral centers. In this instance the invention includes each enantiomer or diastereomer as well as mixtures (e.g. racemic mixtures) of the enantiomers or diastereomers.

For fused ring systems, such as those wherein X and/or Y are divalent cyclic groups, attachment at the 1 and 2 positions is preferred, although other types of fusion such as 1,1 and 1,3 are possible.

A preferred class of modifying agents includes the compounds of formula (I) wherein X is $C_{1-18}$ alkylene and Y is $C_{1-18}$ alkenylene.

One preferred modifying agent is N-(1'-carboxy-2'-phenylethyl)-bicyclo[2.2.2]oct-5-en-2,3 dicarboximide which has the following structure:

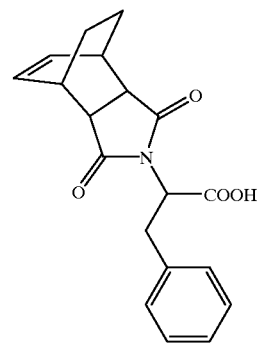

The modifying agent can be included in a composition of the present nvention in an amount sufficient to provide desired optical and/or physical properties to the composition. Preferably, the modifying agent can be present in an amount in the range from about 0.001 to 1 wt-% based on the total composition weight, more preferably from about 0.15 to 0.7 wt-%.

The modifying agents useful in the invention are known and commercially available, or can be readily synthesized from commercially available materials using methods known in the chemical art.

The modifying agents of the invention can improve physical properties of polyolefins such as polypropylene, as well as polyolefin copolymers derived from monomers comprising at least one olefinic monomer. The polyolefins can generally have a melt flow rate in the range from about 1 to 70, preferably about 7 to 35 g/10 min according to ASTM D-1238.

Polyolefins useful in the composition of the invention include polymers and copolymers derived from one or more olefinic monomer of the general formula $CH_2=CHR''$, wherein R'' is hydrogen or $C_{1-18}$ alkyl. Examples of such olefinic monomers include propylene, ethylene, and 1-butene, with propylene being generally preferred. Representative examples of polyolefins derived from such olefinic monomers include polyethylene, polypropylene, polybutene-1, poly(3-methylbutene), poly(4-methylpentene) and copolymers of ethylene with propylene, 1-butene, 1-hexene, 1-octene, 1-decene, 4-methyl-1-pentene, and 1-octadecene.

The polyolefin may optionally comprise a copolymer derived from an olefinic monomer and one or more further comonomers that are copolymerizable with the olefinic monomer. These comonomers can be present in the polyolefin in an amount in the range from about 1 to 10 wt-% based on the total weight of the polyolefin. Useful such comonomers include, for example, vinyl ester monomers such as vinyl acetate, vinyl propionate, vinyl butyrate, vinyl chloroacetate, vinyl chloropropionate; acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid such as dimethyl maleate, and diethyl maleate; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers, and N-vinyl pyrrolidine monomers.

The polyolefin may also contain a metallic salt form of a polyolefin, or a blend thereof which contains free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt. Preferred polyolefins include polypropylene homopolymers and copolymers of propylene with ethylene, 1-butene, 1-hexene, 1-octene, 4-methyl-1-pentene, vinyl acetate, or methyl acrylate.

The polyolefins can also include blends of these polyolefins with other polyolefins or copolymers or blends thereof containing conventional adjuvants such as antioxidants, light stabilizers, acid neutralizers, fillers, antiblocking agents and pigments.

Representative blends of polyolefins useful in this invention include blends of polyethylene and polypropylene, low density polyethylene and high-density polyethylene, and polyethylene and olefin copolymers derived from an olefinic monomer and one or more of the above-described optional copolymerizable comonomers, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The modifying agent may be incorporated into the polyolefin using any method that does not cause significant degradation or vaporization of the modifying agent. This can be accomplished using any mixing method that is convenient, such as a melt mixer, an extruder, and the like. The modifying agent may be dry blended with the polyolefin in flake, granule, or pellet form; a liquid melt, dispersion, suspension or solution of the modifying agent may be combined with the polyolefin in flake, granule, or pellet form; or a concentrated blend of the modifying agent and polyolefin may first be prepared and then blended with the polyolefin to obtain a final desired concentration of modifying agent. If such a concentrated blend is prepared the modifying agent can be present in the concentration blend in an amount in the range from about 0.5 to 5 wt-%.

If desired, components may be added to the polyolefin in addition to the modifying agent. Examples of such components include pigments, antioxidants, acid neutralizers, antistatic agents, ultraviolet light absorbers, and hindered amine stabilizers.

An antioxidant can be added to the polyolefin as a stabilizer in an amount effective sufficient to protect the polyolefin from degradation and/or reaction with other unsaturated or radicalized chemical species, while not causing a substantial negative affect on desired optical qualities (e.g., clarity), or on nucleation.

Although wishing not to be bound by any particular theory, the chemical activity of antioxidants is quite well understood. A polyolefin can react with oxygen, typically from the atmosphere, to produce a hydroperoxide. The hydroperoxide can decompose, e.g., in the presence of heat or in residual amounts of catalytic metal present in the polyolefin, to produce an alkoxy radical and a hydroxy radical. If allowed to persist, these radicals can react with a polyolefin to form a reactive radical site on the polyolefin which, if not quenched, can cause, e.g., degradation of the polyolefin, crosslinking with other radicalized polyolefin molecules, or copolymerization, e.g., graft copolymerization, with other unsaturated chemical species (e.g., other unsaturated components within the polyolefin such as unsaturated additives, including nucleating agents).

Antioxidants can inhibit degradation, crosslinking, or copolymerization of the polyolefin through one of a number of different mechanisms. For example, an antioxidant may prevent the reaction of oxygen with the polyolefin to form hydroperoxides, preventing the formation of radicals therefrom. Or, if hydroperoxides are produced, an antioxidant may then act to prevent the hydroperoxide from decomposing into alkoxy and hydroxy radicals. Alternatively, if such alkoxy and hydroxy radicals are actually produced and react with the polyolefin to produce a radical site on the polyolefin, an antioxidant may quench the polyolefin radicals before decomposition or reaction.

Many different antioxidants and their function are known in the chemical art, including those often referred to as radical scavengers, peroxide decomposers, and metal deactivators. Antioxidants and their function and operation are described, for example, in the Encyclopedia of Polymer Science and Engineering, Volume 2, 73–91 (1985).

Examples of some typical radical scavengers include hydrogen-donating antioxidant compounds that can quench a polyolefin radical by donating a hydrogen, thereby inhibiting or preventing degradation or reaction of the polyolefin. Such compounds include, e.g., hindered phenols, aromatic amines, and hindered amines. Specifically preferred radical scavengers can include, e.g., tetrakis[methylene(3,5-di-t-butyl-4-hydroxyhydrocinnamate)]methane, and octadecyl 3,5-di-t-butyl-4-hydroxyhydrocinnamate.

Typical peroxide decomposers include those antioxidants capable of decomposing a hydroperoxide to a corresponding alcohol before the hydroperoxide can decompose into a hydroxy and an alkoxy radical. Peroxide decomposers include divalent sulfur derivatives and trivalent phosphorous compounds, including tris(2,4-di-t-butylphenyl)phosphite and bis(2,4-di-t-butylphenyl)pentaerythritol diphosphite.

Metal deactivators typically have the ability to chelate metal ions. By chelating the metal ion, the active sites of the metal ion are deactivated, preventing reaction of the metal ion with the hydroperoxides to form radicals. Furthermore, chelation causes a change in the redox potential of the metal ion and therefore deactivation. An example of a metal deactivator is N'N'-bis[3-(3',5'-di-t-butyl-4-hydroxyphenyl) propanyl-hydrazine.

Another group of useful antioxidants are lactone antioxidants. A specific example of a lactone antioxidant is 5,7-di-t-butyl-3-(3,4-di-methylphenyl)-3H-benzofuran-2-one.

Many antioxidants are commercially available, for example, under the trade names Irganox 1010, Irganox 1076, Irgafos 168, and Irganox MD 1024 from Ciba Specialty Chemicals, Corp., Hawthorne, N.Y., under the trade name Ultranox 626 from GE Specialty Chemicals Inc., of Parkersburg W.Va., and under the trade name Sandostab P-EPQ, from Clariant of Charlotte, N.C.

An antioxidant can be used alone or in combination with other antioxidants in a polyolefin, and can be present in the polyolefin in any amount effective to reduce the presence of radicals in the polyolefin, thereby reducing degradation or reaction of the polyolefin. Preferably, an antioxidant can be included in a polyolefin in an amount in the range from about 0.01 to about 3 parts by weight antioxidant based on 100 parts polyolefin.

The modifying agent and antioxidant can be added to the polyolefin at any time during processing of the polyolefin, so long as adequate dispersion of each is obtained before the polyolefin begins to crystallize.

The polyolefin containing a desired amount of modifying agent can be formed into articles as desired in any manner known in the art. For example the polymer can be injection molded, extruded, thermoformed, compression molded, and so on to form desired shapes and articles.

The invention is further described by reference to the following examples, which are understood to be illustrative and not limiting of the invention.

In the following Examples and Comparative Examples, various compositions of polyolefins and clarifying and/or nucleating additives were prepared. The compositions were evaluated by measuring crystallization properties using Differential Scanning Calorimetry (DSC) according to ASTM D-794-85, run at a rate of 20° C./min and by measuring haze using ASTM D 1003-92. All percentages given are in wt % unless otherwise stated.

Examples

Preparative Example 1

N-carboxymethyl-bicyclo[2.2.2]oct-5-en-2,3-dicarboximide

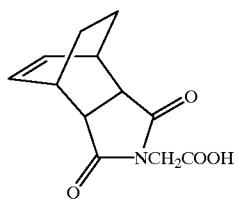

To a suspension of bicyclo[2.2.2]oct-5-en-2,3-dicarboxylic anhydride (688 mg, 3.9 mmol) in H$_2$O (10 mL) was added glycine (348 mg, 4.6 mmol), and a solution of K$_2$CO$_3$ (321 mg, 2.3 mmol) in H$_2$O (2 mL). The mixture was heated to reflux temperature and allowed to react for 4 hrs. After cooling to room temperature, the mixture was acidified with conc. HCl until the pH reached 1 and extracted with ethyl acetate (EtOAc). The organic layer was washed with brine and dried over Na$_2$SO$_4$. Removal of the solvent gave a colorless solid which was recrystallized from EtOAc/hexane to yield the product as colorless crystals: 653 mg (72% yield), mp=142° C.

Preparative Example 2

N-(1'-carboxy-2'-phenylethyl)-bicyclo[2.2.2]oct-5-en-2,3-dicarboximide

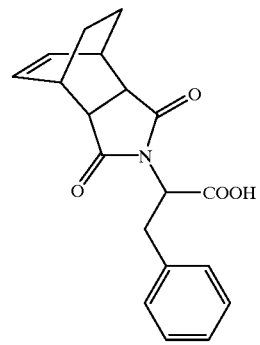

To a solution of maleic anhydride (10.30 g, 105.0 mmol) in toluene (100 mL) was added 1,3-cyclohexadiene (8.41 g, 105.0 mmol). The mixture was heated to reflux temperature and allowed to react for 3 hrs. After cooling to room temperature, the solvent was evaporated and the remaining solid was recrystallized from EtOAc/hexane to yield pure bicyclo[2.2.2]oct-5-en-2,3-dicarboxylic anhydride as colorless crystals: 14.11 g (75% yield), mp=117° C.

To a suspension of L-phenylalanine (502 mg, 3.0 mmol) in H$_2$O (15 mL) was added a solution of K$_2$CO$_3$ (252 mg, 1.8 mmol) in H$_2$O (3 mL) and the mixture was stirred until a homogeneous solution was obtained. Bicyclo[2.2.2]oct-5-en-2,3-dicarboxylic anhydride (452 mg, 2.5 mmol) was added and the mixture was heated to reflux temperature and allowed to react for 19 hrs. After cooling to room temperature, the reaction mixture was washed with EtOAc and acidified with conc. HCl until the pH reached 1. The aqueous phase was extracted with EtOAc and the organic phase washed with 5% HCl followed by brine and then dried over Na$_2$SO$_4$. Removal of the solvent gave a colorless solid which was recrystallized from EtOAc/hexane to yield the pure product as colorless crystals: 475 mg (58% yield), mp=161° C.

Preparative Example 3

N-(1'-carboxy-2'-methylpropyl)-bicyclo[2.2.2]oct-5-en-2,3-dicarboximide

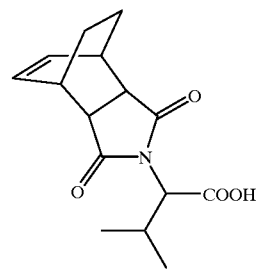

To a suspension of bicyclo[2.2.2]oct-5-en-2,3-dicarboxylic anhydride (2.01 g, 11.3 mmol) in H$_2$O (25 mL) was added (dl)-valine (1.58 g, 13.5 mmol) and a solution of K$_2$CO$_3$ (934 mg, 6.8 mmol) in H$_2$O (3 mL). The mixture was heated to reflux temperature and allowed to react for 4 hrs. After cooling to room temperature, the mixture was washed with EtOAc, acidified with conc. HCl until the pH reached 1 and extracted with EtOAc. The organic layer was washed with 5% HCl followed by brine and then dried over $Na_2SO_4$. Removal of the solvent gave a beige solid which was recrystallized from EtOAc/hexane to yield the product as off-white crystals: 1.72 g (55% yield), mp=156° C.

Preparative Example 4

N-(1'-carboxy-2'-methylbutyl)-bicyclo[2.2.1]hept-5-en-2,3-dicarboximide

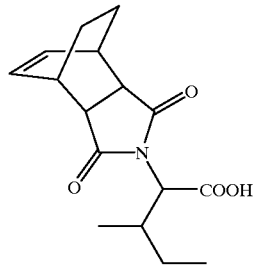

To a suspension of (dl)-isoleucine (2.03 g, 15.5 mmol) in toluene (40 mL) was added triethylamine (2.4 mL, 17.2 mmol). The mixture was heated to reflux temperature and bicyclo[2.2.1]hept-5-en-2,3-dicarboxylic anhydride (2.53 g, 15.5 mmol) was added. The reaction mixture was kept at reflux temperature and allowed to react for 4 hrs. After cooling to room temperature, the solvent was evaporated and the residue dissolved in $H_2O$. The aqueous solution was washed with EtOAc, acidified with conc. HCl until pH=1, and extracted with EtOAc. The organic phase was washed with 5% HCl and brine and dried over $Na_2SO_4$. Removal of the solvent gave a white solid (3.72 g) which was recrystallized from EtOAc/hexane to yield the pure product as colorless crystals: mp=109° C.

Preparative Example 5

N-(4-carboxyphenyl)-bicyclo[2.2.2]oct-5-en-2,3-dicarboximide

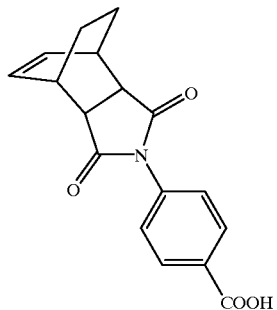

To a solution of $K_2CO_3$ (5.88 g, 42.5 mmol) in H2O (100 mL) was added 4-aminobenzoic acid (5.83 g, 42.5 mmol) and bicyclo[2.2.2]oct-5-en-2,3-dicarboxylic anhydride (7.20 g, 40.4 mmol). The reaction mixture was stirred at room temperature for 18 hrs. and then washed with ethylacetate (EtOAc) (75 ml,). The aqueous phase was acidified with conc. HCl until the pH reached 1. The precipitated crystals were filtered and dried: 11.77 g (98%), mp=269° C.

Formulation Example

A composition of the invention was made in a Haake Rheocord 90 melt mixer by combining 0.950 g of the compound of Preparative Example 1 with 190 g of Quantum™ 8310 GO, available from Quantum Chemical Co., Cincinnati, Ohio. The polymer was a random copolymer with 3% ethylene and contained an additive package of 300 ppm Irganox™ 1010 antioxidant, 500 ppm Ultranox™ 626 antioxidant and 1000 ppm calcium stearate.

The composition was mixed for three minutes at 200° C. and 15 rpm and for an additional five minutes at 170° C. at 50 rpm with a one minute transition period between the two sets of conditions.

The crystallization parameters of the composition were determined by DSC. A sample was heated to 200° C., held for 10 minutes, and cooled at a rate of 20° C. per minute to about 40° C. Crystallization temperature at onset and peak temperature were recorded.

To determine clarification ability of the composition, a compression molded haze plaque was prepared by heating 6.5–7 g of the composition to 200° C. for three minutes on a Carver hotpress. The sample was then pressed to (10,000 psi) with a 0.5 mm spacer for four minutes. The plaque was then water cooled to 20–25° C. Percent haze was then measured on a BYK Gardener XL-211 Hazegard System to determine the haze.

A similar method was used to prepare similar compositions from polyolefin and the compounds described in Table 1.

Control Example

In the Control Example, a compression molded plaque was made in a manner similar to that described in the Formulation Example except that no nucleating or clarifing agent was used. The % haze of the control material was determined by preparing a plaque using a Cincinnati Milacron 50 ACT-D injection molding machine. The machine operated at 230° C. and the mold was maintained at 32° C. After about 30 seconds, the 1.2 mm thick plaque was ejected from the mold and evaluated as above.

A variety of nucleating/clarifying agents were compounded with polyolefin and evaluated for haze and crystallinity as described in the above Formulation Example. The results are reported in Table 1.

TABLE 1

Cyclopentadiene/Cyclohexadiene Derived Anhydrides and Imide Acids as Nucleators/Clarifiers

| Entry | Additive | Additive Conc. (% w/w) | Cryst. Temp. (DSC onset) [° C.] | Cryst. Temp. (DSC peak max) [° C.] | % Haze |
|---|---|---|---|---|---|
| A | none | — | 97.1 | 89.8 | 55 |
| B | (structure) | 0.25 | 109.2 | 105.2 | 36 |
| C | (structure) | 0.5 | 115.7 | 109.5 | 38 |
| D | (structure) | 0.5 | 116.8 | 111.6 | 22 |
| E | (structure) | 0.5 | 105.2 | 100.0 | 22 |
| F | (structure) | 0.5 | 104.4 | 99.0 | 42.5 |

TABLE 1-continued

Cyclopentadiene/Cyclohexadiene Derived Anhydrides and Imide Acids as Nucleators/Clarifiers

| Entry | Additive | Additive Conc. (% w/w) | Cryst. Temp. (DSC onset) [° C.] | Cryst. Temp. (DSC peak max) [° C.] | % Haze |
|---|---|---|---|---|---|
| G | 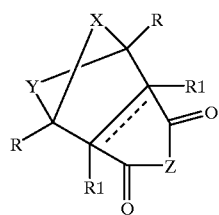 | 0.5 | 108.4 | 102.7 | 48.9 |

The foregoing specification and examples provide a complete description of the invention. However, because many variations are possible without departing from the spirit and scope of the invention, the invention resides solely in the claims which follow.

We claim:

1. A composition comprising a polyolefin, an effective amount of antioxidant, and in an amount effective to act as a nucleating or clarifying agent, a compound of formula (I):

(I)

wherein X is selected from
  $C_{1-18}$ alkylene, $C_{2-18}$ alkenylene, $C_{3-18}$ cycloalkylene, arylene, and —O—;
Y is selected from
  $C_{1-18}$ alkylene, $C_{2-18}$ alkenylene, $C_{3-18}$ cycloalkylene, $C_{4-18}$ cycloalkenylene, and arylene;
Z is selected from
  —O— and —NR2—;
each R is independently selected from
  —H, $C_{1-18}$ alkyl, $C_{3-18}$ cycloalkyl, $C_{2-18}$ alkenyl, $C_{4-18}$ cycloalkenyl, —COR3, —OH, $C_{1-18}$ alkoxy, and $C_{1-18}$ alkyl substituted by one or more —OH, halogen, —COR3, —S—$C_{1-18}$ alkyl, aryl, or substituted aryl groups;
each R1 if present is independently selected from
  —H, $C_{1-18}$ alkyl, $C_{3-18}$ cycloalkyl, halogen, and —OH;
each R2 is independently selected from
  $C_{1-18}$ alkyl substituted by one or more —COR3, and optionally one or more aryl or substituted aryl, $C_{1-18}$ substituted by one or more —OH, halogen, or $C_{1-18}$ alkylene—S—$C_{1-18}$ alkyl, —OH, an other-than-linear-alkyl-substituted aryl substituted by one ore more —COR3, and —O—$C_{1-18}$ alkyl, optionally substituted by NR4R5 and optionally substituted by one or more —COR3;
each R3 is independently selected from —OH, —O—$C_{1-18}$ alkyl, —O—aryl, —O—substituted aryl, or —NR4R5;
  R4 and R5 independently —H, $C_{1-18}$ alkyl, $C_{3-18}$ cycloalkyl, aryl, or substituted aryl; or a salt thereof.

2. The composition of claim 1, wherein X is $C_{1-8}$ alkylene and Y is $C_{2-18}$ alkenylene.

3. The composition of claim 1, wherein X is —$CH_2CH_2$— and Y is —CH=CH—.

4. The composition of claim 1, wherein X is —$CH_2$— and Y is —CH=CH—.

5. The composition of claim 3, wherein Z is —NR2.

6. The composition of claim 1, wherein the compound of formula (I) has the following structure:

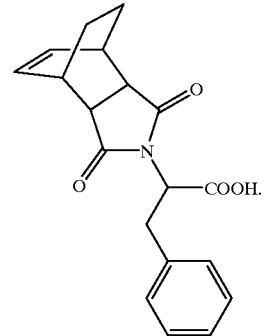

7. The composition of claim 1, wherein Z is —NR2 and R2 is —OH.

8. The composition of claim 1, wherein X and Y are both 1,2-phenylene.

9. The composition of claim 1, wherein each R1 is Cl.

10. The composition of claim 1, wherein the polyolefin comprises a copolymer of propylene and ethylene.

11. The composition of claim 1, wherein the modifying agent is present in an amount in the range from about 0.001 to 1 wt.-%, based on the total weight of the composition.

12. The composition of claim 1, wherein the modifying agent is present in an amount in the range from about 0.15 to 0.7 wt-%, based on the total weight of the composition.

13. The composition of claim 1, wherein the antioxidant is chosen from the group consisting of a radical scavenger, a peroxide decomposer, a metal deactivator, and mixtures thereof.

14. The composition of claim 1, wherein the antioxidant is chosen from the group consisting of a hindered phenol, an aromatic amine, a hindered amine, a divalent sulfur derivative, a trivalent phosphorous compound, a lactone and mixtures therof.

15. The composition of claim 1, wherein the antioxidant is chosen from the group consisting of tetrakis[methylene (3,5-di-t-butyl-4-hydroxyhydrocinnamate)]methane, octadecyl 3,5-di-t-butyl-4-hydroxyhydrocinnamate, tris(2,4-di-t-butylphenyl)phosphite, bis(2,4-di-t-butylphenyl) pentaerythritol diphosphite, N'N'-bis[3-(3',5'-di-t-butyl-4-hydroxyphenyl)propanyl-hydrazine, 5,7-di-t-butyl-3-(3,4-di-methylphenyl)-3H-benzofuran-z-one and mixtures thereof.

16. The composition of claim 1, wherein the antioxidant is present in an amount that will effectively reduce the amount of free-radicals present in the polyolefin.

17. The composition of claim 1, wherein the antioxidant is present in an amount in the range from about 0.01 to about 3 parts by weight antioxidant based on 100 parts polyolefin.

18. A method of enhancing the physical properties of a polyolefin composition comprising polyolefin and an effective amount of antioxidant, the method comprising the step of adding, in an amount to act as a nucleating or clarifying agent, a compound of formula (I):

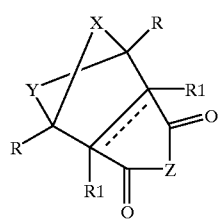

(I)

wherein X is selected from
　$C_{1-18}$ alkylene, $C_{2-18}$ alkenylene, $C_{3-18}$ cycloalkylene, $C_{4-18}$ cycloalkenylene, arylene, and —O—;
Y is selected from
　$C_{1-18}$ alkylene, $C_{2-18}$ alkenylene, $C_{3-18}$ cycloalkylene, $C_{4-18}$ cycloalkenylene, and arylene;
Z is selected from
　—O— and —NR2—;
each R is independently selected from
　—H, $C_{1-18}$ alkyl, $C_{3-18}$ cycloalkyl, $C_{2-18}$ alkenyl, $C_{4-18}$ cycloalkenyl, —COR3, —OH, $C_{1-18}$ alkoxy, and $C_{1-18}$ alkyl substituted by one or more —OH, halogen, COR3, —S—$C_{1-18}$ alkyl, aryl, or substituted aryl;
each R1, if present, is independently selected from
　—H, $C_{1-18}$ alkyl, $C_{3-18}$ cycloalkyl, halogen, and —OH;
each R2 is independently selected from
　$C_{1-18}$ alkyl substituted by one or more —COR3, and optionally one or more aryl or substituted aryl, $C_{1-18}$ alkyl substituted by one or more —OH, halogen, or —$C_{1-18}$ alkylene—S—$C_{1-18}$ alkyl, —OH, an other-than-linear-alkyl-substituted aryl substituted by one or more —COR3, and —O—$C_{1-18}$ alkyl, optionally substituted bu NR4R5 and optionally substituted by one or more —COR3;
each R3 is independently selected from —OH, —O—$C_{1-18}$ alkyl, —O-aryl, —O-substituted aryl, or —NR4R5;
　R4 and R5 are independently —H, $C_{1-18}$ alkyl, $C_{3-18}$ cycloalkyl, aryl, or substituted aryl; or a salt thereof.

19. The method of claim 18, wherein X is $C_{1-18}$ alkylene and Y is $C_{2-18}$ alkenylene.

20. The method of claim 18, wherein X is —CH₂CH₂— and Y is —CH=CH—.

21. The composition of claim 18, wherein X is —CH₂— and Y is —CH=CH—.

22. The method of claim 20, wherein Z is —NR2.

23. The method of claim 18, wherein the compound of formula (I) has the following structure:

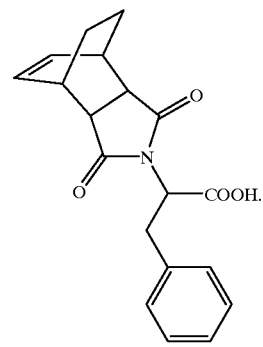

24. The method of claim 18, wherein Z is —NR2 and R2 is —OH.

25. The method of claim 18, wherein X and Y are both 1,2-phenylene.

26. The method of claim 18, wherein each R1 is Cl.

27. The method of claim 18, wherein the polyolefin comprises polypropylene.

28. The method of claim 18, wherein the modifying agent is added to the polyolefin in an amount in the range from about 0.001 to 1 wt.-%, based on the total amount of compound and polyolefin.

29. The method of claim 18, wherein the modifying agent is added to the polyolefin in an amount in the range from about 0.15 to 0.7 wt-%, based on the total amount of compound and polyolefin.

30. The method of claim 18, wherein the antioxidant is chosen from the group consisting of a radical scavenger, a peroxide decomposer, a metal deactivator, and mixtures thereof.

31. The method of claim 18, wherein the antioxidant is chosen from the group consisting of a hindered phenol, an aromatic amine, a hindered amine, a divalent sulfur derivatives, a trivalent phosphorous compound, a lactone, and mixtures therof.

32. The method of claim 18, wherein the antioxidant is chosen from the group consisting of tetrakis[methylene(3, 5-di-t-butyl-4-hydroxyhydrocinnamate)]methane, octadecyl 3,5-di-t-butyl-4-hydroxyhydrocinnamate, tris(2,4-di-t-butylphenyl)phosphite, bis(2,4-di-t-butylphenyl) pentaerythritol diphosphite, N'N'-bis[3-(3',5'-di-t-butyl-4-hydroxyphenyl)propanyl-hydrazine, 5,7-di-t-butyl-3-(3,4-di-methylphenyl)-3H-benzofuran-2-one, and mixtures thereof.

33. The method of claim 18, wherein the antioxidant is present in an amount that will effectively reduce the amount of free-radicals present in the polyolefin.

34. The method of claim 18, wherein the antioxidant is present in an amount in the range from about 0.01 to about 3 parts by weight antioxidant based on 100 parts polyolefin.

* * * * *

UNITED STATES PATENT AND TRADEMARK OFFICE
CERTIFICATE OF CORRECTION

PATENT NO.    : 6,096,811
DATED         : August 1, 2000
INVENTOR(S)   : Stephen E. Amos, George G.I. Moore, Kent E. Nielsen and Markus A. Wicki It is certified that error appears in the above-identified patent and that said Letters Patent is hereby corrected as shown below:

Column 2,
Line 35, the following should be inserted before "each R3 is independently. . ."
-- wherein X is selected from
$C_{1-18}$ alkylene, $C_{2-18}$ alkenylene, $C_{3-18}$ cycloalkylene, $C_{4-18}$ cycloalkenylene, arylene, and –0-;
Y is selected from
$C_{1-18}$ alkylene, $C_{2-18}$ alkenylene, $C_{3-18}$ cycloalkylene, $C_{4-18}$ cycloalkenylene, and arylene;
Z is selected from
-O- and –NR2-;
each R is independently selected from
-H, $C_{1-18}$ alkyl, $C_{3-18}$ cycloalkyl, $C_{2-18}$ alkenyl, $C_{4-18}$ cycloalkenyl, -COR3, -OH, $C_{1-18}$ alkoxy, and $C_{1-18}$ alkyl substituted by one or more –OH, halogen, -COR3, -S-$C_{1-18}$ alkyl, aryl, or substituted aryl groups;
each R1, if present, is independently selected from
-H, $C_{1-18}$ alkyl, $C_{3-18}$ cycloalkyl, halogen, and –OH;
each R2 is independently selected from
$C_{1-18}$ alkyl substituted by one or more –COR3, and optionally one or more aryl or substituted aryl, $C_{1-18}$ alkyl substituted by one or more –OH, halogen, or –$C_{1-18}$ alkylene-S-$C_{1-18}$ alkyl, -OH, an other-than-linear-alkyl-substituted aryl, and –O-$C_{1-18}$ alkyl, optionally substituted by NR4R5; --

Column 3,
Line 40, "-O-$C_{1-8}$" should be -- -O-$C_{1-18}$ --.

Column 13,
Line 45, -- $C_{4-18}$ cycloalkenylene -- should be inserted before arylene.
Line 61, after "$C_{1-18}$" insert -- alkyl --.

UNITED STATES PATENT AND TRADEMARK OFFICE
CERTIFICATE OF CORRECTION

PATENT NO.    : 6,096,811
DATED         : August 1, 2000
INVENTOR(S)   : Stephen E. Amos, George G.I. Moore, Kent E. Nielsen and Markus A. Wicki It is certified that error appears in the above-identified patent and that said Letters Patent is hereby corrected as shown below:

<u>Column 15,</u>
Line 60, "bu" should be -- by --.

Signed and Sealed this

Twenty-first Day of January, 2003

JAMES E. ROGAN
*Director of the United States Patent and Trademark Office*